United States Patent
Langer et al.

(10) Patent No.: US 7,720,709 B1
(45) Date of Patent: May 18, 2010

(54) METHOD FOR CONTROLLING A MACHINE DISPENSING GOOD AND CHARGING OF GOODS THUS DISPENSED

(75) Inventors: Michael Langer, Bonn (GB); Patrik Ljungström, Königswinter (DE); Uwe Michel, Bad Honnef (DE); Johann Reindl, Bonn (DE); Leonhard Schmickler, Bonn (DE)

(73) Assignee: T-Mobile Deutschland GmbH, Bonn (DE)

( * ) Notice: Subject to any disclaimer, the term of this patent is extended or adjusted under 35 U.S.C. 154(b) by 1791 days.

(21) Appl. No.: 10/089,253

(22) PCT Filed: Sep. 28, 2000

(86) PCT No.: PCT/DE00/03419

§ 371 (c)(1),
(2), (4) Date: Aug. 26, 2002

(87) PCT Pub. No.: WO01/24120

PCT Pub. Date: Apr. 5, 2001

(30) Foreign Application Priority Data

Sep. 28, 1999 (DE) ................................ 199 46 529

(51) Int. Cl.
*G06Q 20/00* (2006.01)
(52) U.S. Cl. .............................. 705/16; 705/53; 705/64; 235/381
(58) Field of Classification Search ................... 705/16, 705/53, 64
See application file for complete search history.

(56) References Cited

U.S. PATENT DOCUMENTS 5,991,749 A * 11/1999 Morrill, Jr. ................... 705/44

(Continued)

FOREIGN PATENT DOCUMENTS

DE 41 34 410 A1 4/1993

(Continued)

OTHER PUBLICATIONS

Japanese Patent Office: *Patent Abstracts of Japan*; publication No. 09097368; date of publication: Apr. 8, 1997; applicant: Sanyo Electric Co Ltd; title: "Automatic Vending Machine".

*Primary Examiner*—Ramsey Refai
(74) *Attorney, Agent, or Firm*—Browdy and Neimark, PLLC

(57) ABSTRACT

A method for controlling and operating a vending machine that incorporates a mobile radiocommunication transmit/receive unit and can be called from a user's mobile telephone unit over a mobile telephone network via an abbreviated mobile telephone number affixed on the vending machine. The method includes, upon receipt of a call from the user's mobile telephone unit to the abbreviated mobile telephone number on the vending machine, establishing a connection to a bank and determining if the user has an account at that bank, and if so, whether there are sufficient funds in the user's account, if the user has an account and there are sufficient funds, prompting, via the vending machine, the user to select a merchandise item, after the merchandise item has been dispensed, generating, a billing entry in the vending machine, and settling the billing entry via a payment gateway, the step of settling comprising accessing a mini-payment account the user has opened with a bank, and determining the mini-payment account number based on the user's mobile telephone number.

6 Claims, 1 Drawing Sheet

U.S. PATENT DOCUMENTS

| | | | |
|---|---|---|---|
| 6,282,523 B1 * | 8/2001 | Tedesco et al. | 705/45 |
| 6,430,268 B1 * | 8/2002 | Petite | 379/39 |
| 6,584,309 B1 * | 6/2003 | Whigham | 455/414.1 |
| 6,604,086 B1 * | 8/2003 | Kolls | 705/14 |
| 6,763,336 B1 * | 7/2004 | Kolls | 705/44 |
| 6,868,391 B1 * | 3/2005 | Hultgren | 705/26 |
| 7,020,691 B2 * | 3/2006 | Ota et al. | 709/217 |
| 7,084,737 B1 * | 8/2006 | Moore et al. | 340/5.91 |

FOREIGN PATENT DOCUMENTS

| | | |
|---|---|---|
| DE | 41 42 703 A1 | 6/1993 |
| DE | 692 28 742 T 2 | 10/1999 |
| DE | 198 34 842 A1 | 2/2000 |
| DE | 199 10 005 A1 | 9/2000 |
| EP | 0 560 946 B1 | 9/1993 |
| JP | 8-249530 | 9/1996 |
| WO | WO 98/11519 A1 | 3/1998 |
| WO | WO 99/22346 A1 | 5/1999 |
| WO | WO 00/19748 A1 | 4/2000 |
| WO | WO 00/38443 A2 | 6/2000 |
| WO | WO 00/54237 A1 | 9/2000 |

* cited by examiner

METHOD FOR CONTROLLING A MACHINE DISPENSING GOOD AND CHARGING OF GOODS THUS DISPENSED

FIELD

The present invention is concerned with a method for controlling a vending machine and charging of a dispensed item of merchandise that incorporates a mobile radiocommunication transmit/receive unit and can be called from a user's mobile telephone end unit (7) over a mobile telephone network (8) via an (abbreviated) mobile telephone number affixed on the vending machine, wherein the vending machine (19) prompts the user to select the merchandise and, after the merchandise has been dispensed, generates a billing entry.

BACKGROUND

Patent document WO-A-99 22346 reveals a method for controlling a vending machine and charging of a dispensed item of merchandise using a mobile telephony system. A user can order an item of merchandise from the vending machine with his mobile telephone by dialing a vending machine telephone number that is displayed on the vending machine. The item of merchandise is charged with the aid of billing data that are matched to the user's telephone number and billed with his telephone bill.

A method for controlling a vending machine and charging of a dispensed item of merchandise using a mobile telephony system is also known from patent document JP-A-08249530A. The user can control a vending machine with his mobile telephone in such a way that he is recognized by the system based on his telephone number. Billing data are generated that are transmitted to a billing center, where the incurred costs are charged.

The present invention is based on the following object (problem):

A method shall be presented for a simple control of a vending machine and a simple and cashless charging of the dispensed item of merchandise.

SUMMARY

This object is met with a method for controlling and operating a vending machine (1) that incorporates a mobile radiocommunication transmit/receive unit and can be called from a user's mobile telephone end unit (7) over a mobile telephone network (8) via an (abbreviated) mobile telephone number affixed on the vending machine, wherein the vending machine (19) prompts the user to select the merchandise and, after the merchandise has been dispensed, generates a billing entry, characterized in that the billing entry is settled via a payment gateway (4) that has access to a mini-payment account the user has opened with a bank (5), the mini-payment account number of which is determined based on the user's mobile telephone number.

A vending machine has a mobile radiocommunication transmit/receive unit, e.g., a GSM module, and can be called by the customer from his mobile telephone via an (abbreviated) mobile telephone number affixed on the vending machine. The vending machine prompts the customer to select the merchandise and, after dispensing the item of merchandise, generates a billing entry that must be settled. In the case of prepaid customers, a balance verification must be performed prior to dispensing the merchandise.

ADVANTAGES COMPARED TO THE PRIOR ART

The known methods for charging for transactions or services via a telecommunications network require that a mini-payment account be kept directly in the IN-SCP. This requires the operator to have a banking license. This is circumvented in the present invention in such a way that an account with an outside banking organization is accessed.

The voice access to the vending machine is an important simplification for the GSM user compared, e.g., to the SMS access. Furthermore, the reservation process permits an online verification of available funds and the electronic billing entry can nevertheless be processed offline. The reservation and billing entry can be uniquely matched to one another based on the telephone numbers.

DETAILED DESCRIPTION

Figure 1:
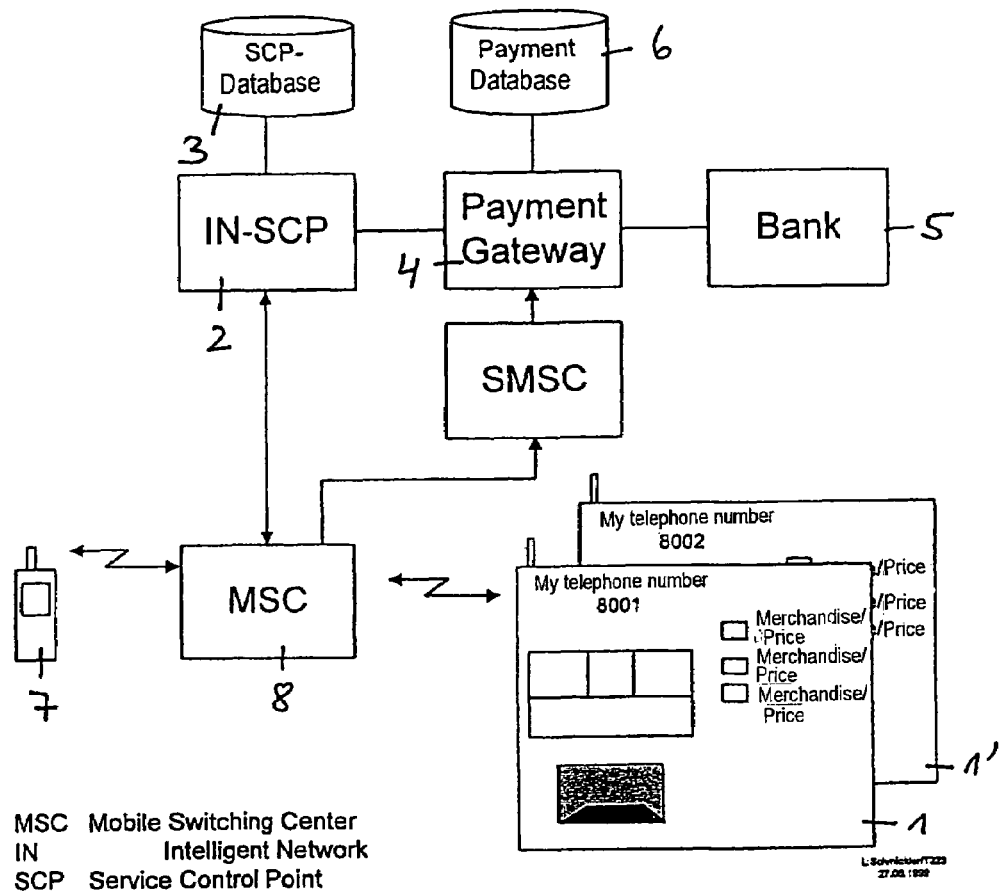
FIG. 1 shows an example of an inventive system architecture.

The vending machine 1, 1' incorporates a GSM module and a GSM telephone number. Merchandise with different prices can be selected from the vending machine. Displayed on the vending machine is an (abridged) telephone number.

The IN-SCP 2 (Intelligent-Network Service Control Point) incorporates a database 3 in which the abridged number of the vending machine is mapped to an unabridged telephone number. This can be done using the location information from the call data of the call placed by the GSM user. The IN-SCP is furthermore also connected to a payment gateway 4.

The payment gateway 4 has online access to a mini-payment account, which is kept at a bank 5. In the payment database 6, a mini-payment account number has been established for each user. The current account information is known in the payment database 6 at all times through regular comparison or online access to the bank 5. The GSM user is standing in front of a vending machine 1, 1' with his mobile telephone unit 7. He dials the (abbreviated) telephone number displayed on the vending machine. In the MSC 8, it is detected that this is a special number that needs to be analyzed in the IN-SCP 2. From the MSC, a communication line is established to the IN-SCP, and the telephone number of the GSM user, the dialed telephone number, and the GSM user's location are transmitted.

The IN-SCP 2 determines the vending machine's actual telephone number. At the same time it establishes a connection to the payment gateway 4 and requests that a maximum amount of, e.g., DM 5.00, be reserved with reference to the vending machine on the account of the GSM user who has been uniquely identified by his telephone number.

The payment gateway 4 determines, based on the GSM user's telephone number, his mini-payment account number and the current account balance. If there are sufficient funds, the reservation is carried out with a reference to the vending machine telephone number and acknowledged positive to the IN-SCP 2. A reserved amount is not available for other payments until it has been cleared. The reservation is acknowledged negative if there are insufficient funds, if the customer is listed on a black list, or if he does not have an account. If the acknowledgement from the payment gateway is negative, the IN-SCP 2 informs the MSC 8 that the connection should be terminated. The MSC 8 can play a recording to the user stating the reason for the terminated connection. If the payment gateway 4 acknowledgment is positive, the IN-SCP 2 informs the MSC 8 of the unabridged telephone number of the vending machine. The MSC 8 establishes a voice connection to the vending machine 1, 1'. The vending machine 1, 1' identifies, from the ISDN signal, the telephone number of the GSM user and prompts the user to select an item of merchandise. The user communicates with the vending machine via his mobile telephone 7. The vending machine 1, 1' can, at that time, also play a recording for the user. After that, the SGM connection between the user and vending machine can be initiated by the vending machine 1, 1'. The user now pushes a selection button, the merchandise is dispensed and the vending machine 1, 1' generates an electronic billing entry. The billing entry includes, e.g., the vending machine telephone number, the GSM user's telephone number, merchandise identification and price. It is transmitted by the vending machine 1, 1', e.g., via a GSM short message or GSM USSD, to the payment gateway 4.

The payment gateway 4 receives the electronic billing entry and determines, based on the user's GSM telephone number, his mini-payment account. It recognizes, based on the vending machine telephone number, the reservation that was previously made by the IN-SCP 2 and clears the same. The price for the merchandise is debited to the user's account and credited, by means of a credit entry, to the account of the vending machine operator.

The connection between the reservation and billing entry can also be made with the aid of a reference number. When a reservation is made, the payment gateway 4 issues a reference number and communicates the same to the IN-SCP 2 as part of the positive acknowledgement. The IN-SCP 2 transmits it to the vending machine 1, 1' when establishing the connection, e.g., as a UUS parameter or as a subaddress. The vending machine 1, 1' adds this reference number to the billing entry and the payment gateway 4 can uniquely match the reservation and billing entry. The payment gateway 4 automatically clears a reservation after a predefined maximum time if no billing entry has arrived from the vending machine 1, 1' by then. The reserved funds are then available again for other payments.

What is claimed is:

1. A method for controlling and operating a vending machine when a user has an account at a bank and there are sufficient funds in the user's account, the vending machine incorporating a mobile radiocommunication transmit/receive unit and configured to be called from the user's mobile telephone unit over a mobile telephone network via an abbreviated mobile telephone number affixed on the vending machine, comprising:

upon receipt of a call from the user's mobile telephone unit to the abbreviated mobile telephone number on the vending machine, establishing a connection to the bank, prompting, via the vending machine, the user to select a merchandise item, after the merchandise item has been dispensed, generating a billing entry in the vending machine, settling the billing entry via a payment gateway, the step of settling comprising accessing the user's account, and determining the account number based on the user's mobile telephone number, issuing a request to the payment gateway, with a reference to the vending machine, to reserve a certain maximum amount from the account of the user who has been uniquely identified based on his telephone number, determining the actual telephone number of the vending machine in an intelligent-network control point, establishing a connection from the intelligent-network control point to the payment gateway, making the reservation of the certain maximum amount with the reference to the telephone number of the vending machine, positively acknowledging the reservation in the intelligent-network control point, holding the reserved amount unavailable for other payments until the reserved amount has been cleared, if an acknowledgement from the payment gateway is positive, informing, via the intelligent-network control point, a mobile switching center of an unabridged telephone number for the vending machine, establishing a voice connection, via the mobile switching center, to the vending machine, identifying, in the vending machine, from the ISDN signal, the telephone number of the user, and wherein the step of prompting the user, via the vending machine, to select the merchandise item comprises prompting the user in such a way that the user communicates with the automatic vending machine via his mobile telephone unit, wherein after the user is prompted to select a merchandise item, the GSM connection between the user and vending machine is initiated by the vending machine, wherein when the user presses a selection button, the selected merchandise item is dispensed, and wherein the step of generating a billing entry comprises causing the vending machine to generate an electronic billing entry.

2. A method according to claim 1, wherein charging for the dispensed merchandise item takes place by combining standard IN traffic control with standard Internet payment systems.

3. A method according to claim 1, wherein the billing entry includes the vending machine telephone number, the GSM user's telephone number, a merchandise identification and the price.

4. A method according to claim 1, further comprising transmitting the billing entry by the vending machine to the payment gateway via a GSM short message or GSM-USSD.

5. A method according to claim 1, further comprising:

receiving the electronic billing entry at the payment gateway, determining, at the payment gateway, based on the GSM telephone number of the user, the account of the user, and recognizing and clearing, at the payment gateway, based on the vending machine telephone number, the reservation previously made by the intelligent-network service control point, wherein the step of recognizing and clearing comprises:

debiting the cost of the merchandise item to the user's account, and crediting the cost of the merchandise item to an account of the vending machine operator via a credit entry.

6. A method according to claim 1, further comprising controlling the vending machine by a voice connection.

* * * * *